July 12, 1927. Re. 16,674
T. M. CHANCE
METHOD AND APPARATUS FOR SEPARATING MATERIALS OF DIFFERENT SPECIFIC GRAVITIES
Original Filed July 7, 1922 3 Sheets-Sheet 1
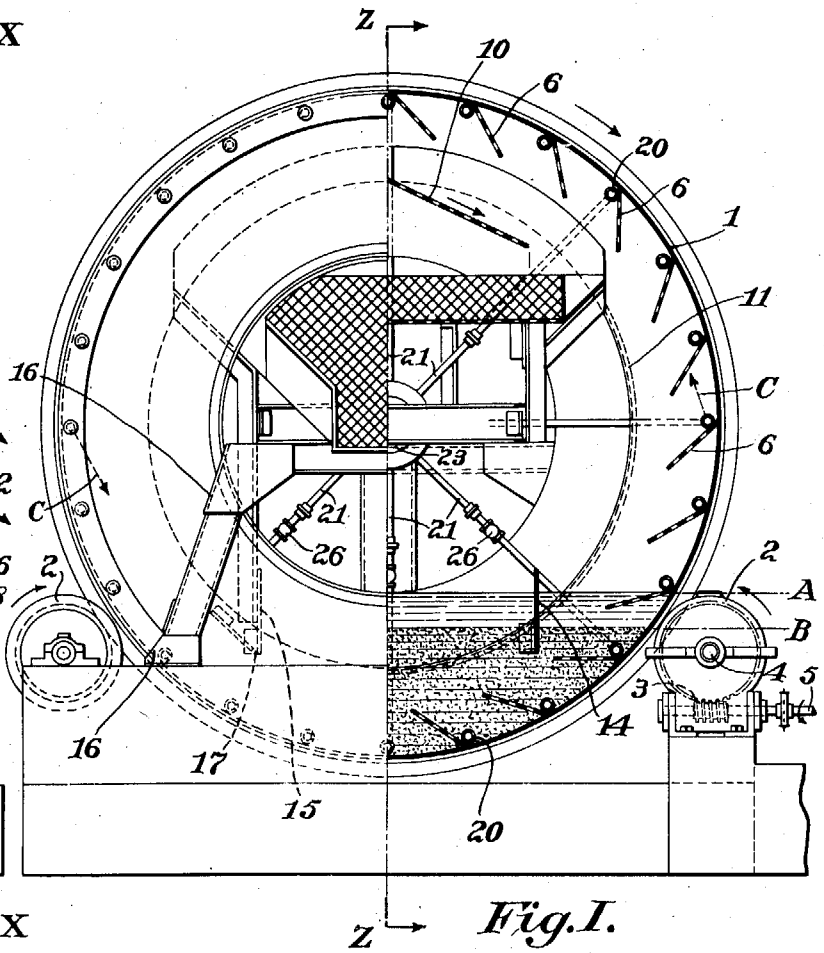
Fig. I.
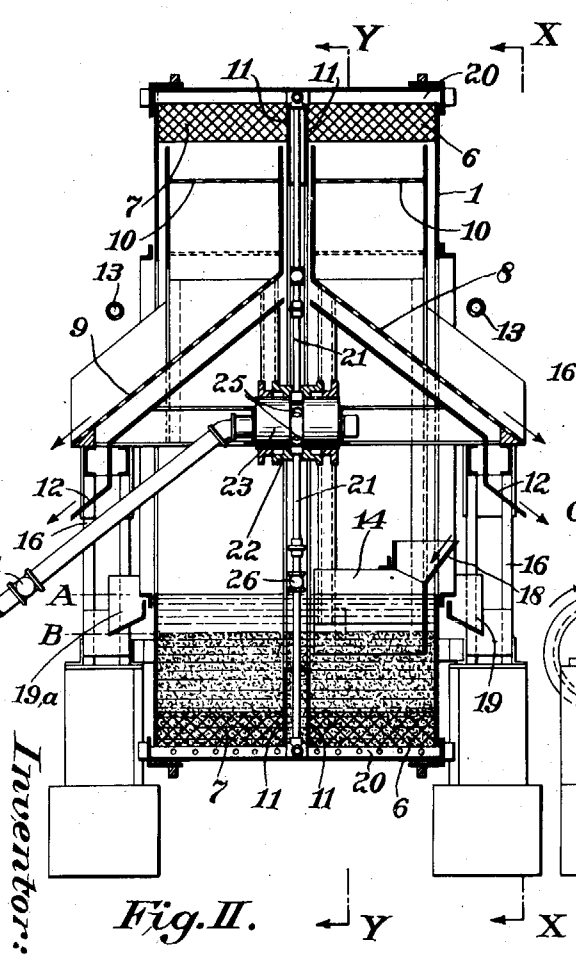
Fig. II.
Inventor:
Thomas M. Chance,
by Spear, Middleton Donaldson & Hall
Attys.

July 12, 1927. T. M. CHANCE Re. 16,674
METHOD AND APPARATUS FOR SEPARATING MATERIALS OF DIFFERENT SPECIFIC GRAVITIES
Original Filed July 7, 1922 3 Sheets-Sheet 2
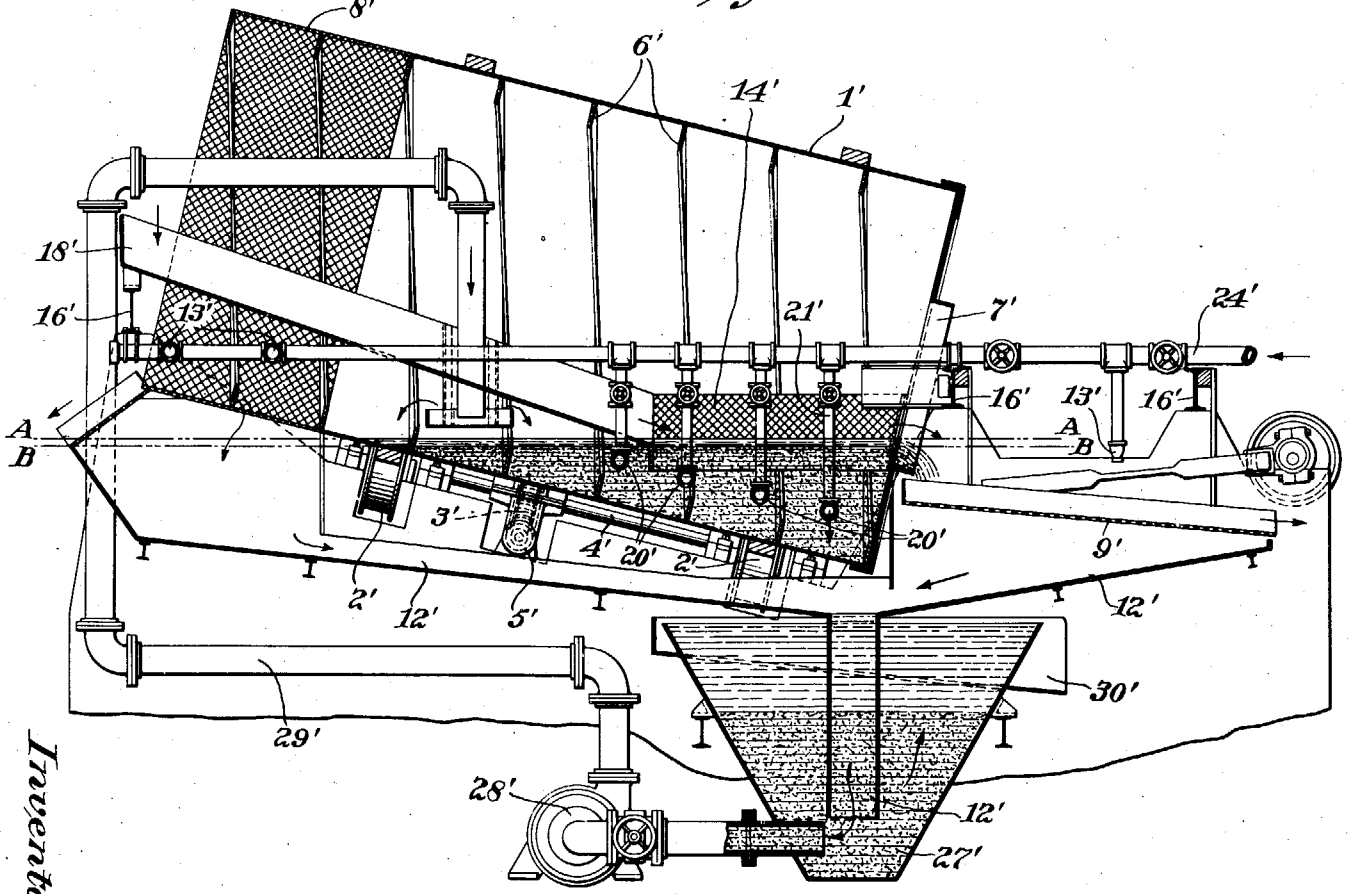
Fig. III.
Inventor:
Thomas M. Chance,
by Spear, Middleton, Donaldson & Hall
Attys.

July 12, 1927. T. M. CHANCE Re. 16,674
METHOD AND APPARATUS FOR SEPARATING MATERIALS OF DIFFERENT SPECIFIC GRAVITIES
Original Filed July 7, 1922 3 Sheets-Sheet 3
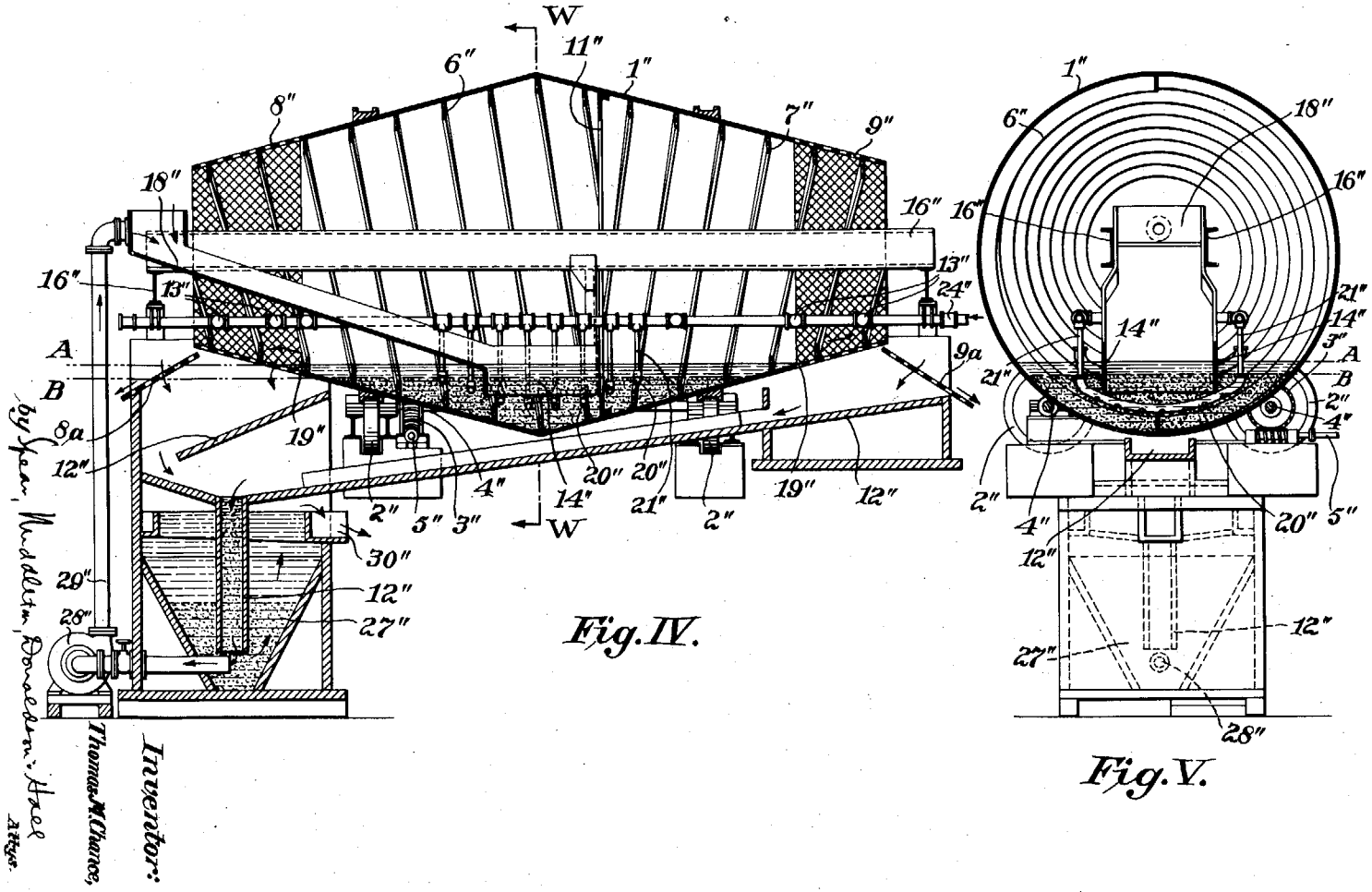

Reissued July 12, 1927. Re. 16,674

UNITED STATES PATENT OFFICE.

THOMAS M. CHANCE, OF PHILADELPHIA, PENNSYLVANIA.

METHOD AND APPARATUS FOR SEPARATING MATERIALS OF DIFFERENT SPECIFIC GRAVITIES.

Original No. 1,559,938, dated November 3, 1925, Serial No. 573,471, filed July 7, 1922. Application for reissue filed March 15, 1926. Serial No. 94,969.

My invention relates to a method and apparatus for washing coal and concentrating ores in which materials of different specific gravities are separated by immersion in a fluid mass of specific gravity great enough to effect the flotation of that portion of said materials of lower specific gravity.

By the term fluid mass I means to include any mixture of liquid and comminuted solids substantially insoluble therein, which can be made to approach the properties and fluidity of a true liquid and which requires agitation for such approach to said properties and fluidity.

In carrying out my present method the apparatus used may be greatly varied and the accompanying drawings are merely representative of the general association of elements necessary to the operation of said method.

A characteristic of my invention is that the fluid mass, which I use as a vehicle of high specific gravity for the separation of materials of different specific gravities, is assisted by the direct application of energy in the receptacle which contains said fluid mass during the separatory process, said assistance being secured through the rotation of said receptacle. A further characteristic of my invention is that the means employed for removing the separated material of high specific gravity from the body of the fluid mass may be caused to function both as a conveying element and as a further means to the maintenance of the fluidity of said fluid mass by the rotation of said receptacle.

In the accompanying drawings I have illustrated diagrammatically three types of apparatus to carry out my method.

Fig. I is a combined vertical and cross-sectional view, on the lines X—X and Y—Y of Fig. II, of apparatus in which rotation of the receptacle containing the fluid mass causes the conveying elements for removing the separated materials, of both high specific gravity and low specific gravity, from said fluid mass, to function.

Fig. II is a transverse vertical cross-sectional view of the apparatus shown in Fig. I, on the line Z—Z thereof.

Fig. III is a longitudinal vertical cross-sectional view of an apparatus in which the separated material of low specific gravity is removed from the separating receptacle by an overflow and that of high specific gravity by a conveying element, in this case a worm, adapted to function by the rotation of said receptacle.

Fig. IV is a longitudinal vertical cross-sectional view of apparatus in which both conveying elements function by the rotation of the separating receptacle, these conveying elements for the separated materials of high and low specific gravity both being of the internal worm type.

Fig. V is a transverse cross-sectional view of the apparatus shown in Fig. IV on the line W—W thereof.

In the several drawings like numbers indicate like parts.

In the drawing, Fig. I, 1 indicates a cylindrical separating receptacle, supported by rollers 2 at either end, rotation of said drum being secured through operation of worm gear 3, attached to roller shaft 4, driven by worm shaft 5. The axis of said drum 1 may be horizontal as shown or inclined. The conveying elements for removing the separated materials of high and low specific gravity are shown at 6 and 7 respectively, comprising perforated plates secured to drum 1 and forming with the casing of drum 1 and division plates 11, elevator buckets integral with said drum. Circular division plates 11, rigidly attached to drum 1, serve to divide said drum into two compartments, one of these compartments forming conveying element 6 and also the separating compartment and the other of these compartments forming conveying element 7. Said conveying elements 6 and 7 discharge into chutes 8 and 9 respectively, the fall of the separated materials from the buckets being cushioned by baffles 10. These baffles and chutes are shown as perforated plates, the portions of fluid mass mixed with or adhering to the separated materials being thus permitted to pass through the perforations and collected by chutes 12, this action being assisted by sprays provided by spray pipes 13. The separated floating materials of low specific gravity are prevented from entering the buckets of conveying element 6 by wing plates 14 and 15, these wing plates being fixed in space and not adapted to rotate with drum 1. To secure this result and also to provide support for the stationary chutes 8 and 9, the latter together with said wing plates are carried by external stationary supports 16. Wing plate 15 is further provided with hinged and weighted extension 17, designed ordinarily to hang in a vertical position, but adapted to swing in the direction of rotation of the drum, thereby preventing the jamming of large pieces of material of high specific gravity which might protrude from the buckets during their passage thereunder. A feed chute 18 is attached to the stationary wings 14 and 15 and stationary water overflows 19, 19ª are provided for collecting the water discharging from the drum 1. Fluid mass chutes 12, spray pipes 13, feed chute 18 and water overflows 19 have not been illustrated in Fig. I for the sake of greater clarity in the drawing.

Drum 1 is provided with jet pipes 20, these pipes being rigidly attached thereto and communicating with central feed pipes 21 receiving hydraulic water from sleeve 22, which rotates on fixed journal 23, provided with water inlet 24 and water inlet ports 25. Water inlet ports 25 are spaced around a portion of the circumference of journal 23 and thus act as valves to cut off the supply of pipes 21 during a portion of the revolution of drum 1. The jet pipes 20 may thus be made to function as agitating means for assistance in preserving the fluidity of the fluid mass during that portion of the revolution from the entrance of said pipes into the top of the fluid mass, shown in the drawings as the line B—B, until they leave said top at the opposite side of the apparatus. These jet pipes will then function as spray pipes for washing off the portions of fluid mass adhering to the separated materials until the drum has revolved to a point at which said separated materials are discharged from said conveying elements 6 and 7, such point being in the vicinity of the top of said drum. The further revolution of the drum from this latter point to that of re-entrance into the top of the fluid mass will not require the issuance of water from these pipes, and sleeve 22 acting in conjunction with ports 25 may therefore be arranged to cut off the supply of water during this latter portion of the revolution. It will of course be understood that such valved action is not essential to the operation of the apparatus and may, if desired, be dispensed with, or that any other desired distribution of the water may be effected by changing the position of the inlet ports. In the designs shown in Figs. I and II, the jet pipes 20 are arranged to be operated in groups of three from feed pipes 21, the sprays issuing from said jet pipes being designed to flow rearwardly so as to assist in washing the materials out of the next succeeding bucket, as shown by directional lines C in Fig. I, and the feed pipes 21 are provided with check valves 26, to prevent reversal of flow when water is cut off by the valved action of ports 25. It will be understood that appropriate chutes may be provided for returning the fluid mass from chutes 12 to the body thereof contained in drum 1, the return of such portions of said fluid mass being accompanied by the removal of particles which it may be desirable to remove therefrom, such as large pebbles, particles of high specific gravity, particles of very low specific gravity, etc., if this be advisable.

The operation of the method when designed to employ this apparatus in conjunction with the method of separating materials of different specific gravities described and claimed in U. S. Patent 1,224,138, May 1, 1917, to Thomas M. Chance, in that particular embodiment designed for the washing of coal is as follows:

Assuming drum 1 to be filled to the line B—B with a fluid mass composed of an agitated mixture of comminuted insoluble solid material and water, agitation of such mass is continued by the combined action of the rotation of drum 1, in the direction of the arrow, by translating conveyor elements 6 and 7 through said fluid mass and also by the introduction of hydraulic water through the jet pipes 20. If such a fluid mass be so maintained in a fluidic condition and at a density sufficient to float the coal and permit the refuse to sink,—that is at a density as great or greater than that of the coal and less than that of the refuse,—and the material to be separated is introduced through feed chute 18, the refuse will sink into conveying element 6 and will be removed by rotation of drum 1 from the body of the fluid mass. Tendency of the coal floating at the top of said fluid mass to float into the buckets of said conveying element is prevented by wing plates 14 and 15 and tendency of the refuse to travel into the clean coal compartment is prevented by division plate 11 forming one side of the conveying element 6.

The clean coal floating at or near the top of the fluid mass passes over division plate 11, into the clean coal conveying element 7 and is removed from the fluid mass by the rotation of the drum in the same manner as the refuse, the conveying element 7 serving to this end. The separated refuse and coal are discharged from conveying elements 6 and 7 respectively over baffles 10 into chutes 8 and 9, leaving the apparatus in the direction of the arrows. Portions of the fluid mass still adhering to the separated refuse and coal are removed by spray pipes 13, passing through the perforated bottoms of chutes 8 and 9 into chutes 12, the solid constituent of such portions being returned to the fluid mass contained in drum 1, if this is desired. If desired, a superimposed body of water may be carried on the fluid mass as indicated by the line A—A, this body of water acting as a washing agent as described and claimed in U. S. Patent 1,392,399, October 4, 1921, to Thomas M. Chance.

In the drawing, Fig. III, 1′ indicates an inclined cylindrical drum adapted to be rotated about its axis, said drum being filled, approximately to the line B—B, with the fluid mass, and being supported on rollers 2′, adapted to be driven by worm gear 3′, attached to shaft 4′, and driven by worm drive 5′. As noted in the description of Figs. I and II, the superimposed body of water may be carried above the fluid mass, if desirable,—the top of such a body being shown by the line A—A.

In this embodiment of apparatus designed to employ the invention the conveying element for the removal of material of high specific gravity from the body of the fluid mass is an internal worm 6′, either multi-thread as shown or single thread, rigidly attached to the body of said drum 1′, and operating as a conveying element by rotation of drum 1′ about its axis. The removal of the material of high specific gravity through the functioning of conveying element 6′ is accompanied by a translation of said material over perforated segments 8′ of drum 1′, the portions of fluid mass adhering thereto being washed through the perforations of said segments by spray pipes 13′ into collecting chute 12′ by which they are returned to sump 27′, from whence said portions of said fluid mass are delivered by pump 28′ and conduit 29′ to the separating body of fluid mass contained in drum 1′. The materials of lower specific gravity are removed from drum 1′ by overflow of a portion of the fluid mass through circular discharge weir 7′, these materials passing over screen 9′, in this case shown as a shaker screen, for the removal of that portion of the fluid mass overflowing with, or adhering to, said materials, said portions of said fluid mass passing through the perforations of screen 9′ into collecting chute 12′ and from thence into sump 27′; their return to the body of separating fluid mass contained in drum 1′ being effected by pump 28′ and conduit 29′ as in the case of fluid mass passing through segments 8′. Stationary wing plates 14′ are provided to prevent the separated materials of lower specific gravity from floating over and into the conveying worm 6′, these wing plates dipping below the surface of the fluid mass a sufficient distance to accomplish this end, and a stationary feed chute 18′ is provided for introducing the materials to be separated into the fluid mass contained in drum 1′. The wing plates 14′ and chute 18′ are carried by fixed supports 16′. Hydraulic water is introduced through agitation pipes 20′, in this particular embodiment of apparatus shown as fixed in space, but not necessarily so fixed, said agitation pipes and the spray pipes 13′ being connected to a common hydraulic water inlet 24′. Pump 28′ serves to deliver a fixed volume of fluid mass and liquid from sump 27′ to drum 1′, this fixed volume continuously overflowing discharge weir 7′ and thus functioning as a conveying element for the removal of materials of lower specific gravity floating at or near the top of the fluid mass in drum 1′ and between plates 14′. It will, therefore, be clear that pump 28′ cannot return the excess liquid provided by agitation pipes 20′ and spray pipes 13′, which liquid is returned in common with said fixed volume of said fluid mass and delivered to sump 27′. This excess liquid must therefore rise through sump 27′ to overflow 30′, from whence it is carried to waste or returned to the agitation or spray system. By properly proportioning the apparatus this upward current in sump 27′ may be used to remove fine material of low specific gravity, either by said sump being operated as a pure hydraulic classifier or by a secondary fluid mass, agitated by said current, being maintained therein.

Such proportioning of the apparatus is illustrated diagrammatically by Fig. III, which shows a vertical conduit 12′ projecting downwardly into the region adjacent to the outlet near the base of the sand sump 27′, which outlet is shown as the suction pipe of sand pump 28′; the diameter of said conduit 12′ being relatively small as compared with the diameter of the sand sump at the top, in the proportion of about 1 to 8, their cross-sectional areas therefore being about as 1 to 64. With such proportioning the upward velocity of rising liquid in the upper part of the sand sump will be relatively small, while the downward velocity in 12′ will be relatively very great, and the momentum of the liquid and fluid mass impinging downwardly as it issues from 12′ will produce violent agitation in the region adjacent to the outlet of the sand sump, retarding or preventing the sedimentation of sand and keeping the lower part of the sand sump filled with an agitated mixture of sand, water and other lighter fine materials that may be present and the removal of which is thus rendered possible. In those embodiments of the invention in which said sump is operated as a pure hydraulic classifier, the area of the upper portion thereof must be suitably proportioned to give the desired velocity to the more or less fixed volume of said upward current, to the end that fine material of low specific gravity may be removed. Another embodiment of the invention in which fine material of low specific gravity is removed by means of a secondary fluid mass, maintained in said sump and agitated by said current, is shown by the drawing Fig. III, in which the agitated mixture constituting this secondary fluid mass is indicated in the drawing by stippling, occupying the lower portion of the sand sump. Continued accretions of solids will raise the top of this secondary fluid mass (unless otherwise removed) until it overflows from the sand sump 27′; thus making it possible to remove such fine material of low specific gravity. Here again, it is necessary to so proportion the apparatus that the desired density of the secondary fluid mass will be properly attained with the more or less fixed volume of said upward current.

It will be clear from the foregoing that maintenance of the fluidic properties of the fluid mass may be concurrently attained by the rotation of drum 1′, the conveying effect of internal worm 6′ produced by said rotation, and the introduction of hydraulic water through agitation pipes 20′.

The operation of the apparatus shown by Fig. III is sufficiently simple, the only difference between such operation and that of the apparatus shown in Figs. I and II being in the different method of removal of the separated materials.

In the drawings, Figs. IV and V the separating receptacle is a rotating drum 1″, formed by two truncated cones joined at their common base and with a common axis horizontally placed. Rotation is effected by rollers 2″, supporting drum 1, through worm gear 3″, keyed to shaft 4″, and driven by worm and shaft 5″. The conveying element for the material of high specific gravity is internal worm 6″, rigidly attached to the interior of said drum 1″, and the conveying element for that of low specific gravity is also an internal worm 7″ rigidly attached to said drum 1″. These worms are shown as of the multi-thread type but it will be understood that single thread worms may be employed. The top of the fluid mass is indicated by the line B—B and a superimposed body of wash liquid may be carried above the fluid mass, if this be desirable, the top of such liquid being shown by line A—A. The portions of drum 1″ extending beyond the horizon of said body of liquid advantageously may be formed of perforate segments 8″ and 9″, for the expeditious removal of portions of the fluid mass adhering to the separated materials being conveyed from the body of the fluid mass by worms 6″ and 7″, this removal being further assisted by sprays issuing from spray pipes 13″. The separating compartment is formed by the walls of drum 1″ coacting with the stationary wing plates 14″, these latter functioning to prevent material of low specific gravity floating at or near the top of the fluid mass passing over into the heavy material worm 6″. These wing plates are fixed in position by stationary supports 16″ which also serve to carry feed chute 18″ bringing the materials to be separated into the separating compartment of the apparatus. Accidental translation of heavy material into the light material worm 7″, is prevented by circular division plate 11″.

The separated materials transported from the interior of drum 1″ by worms 6″ and 7″ pass out of said drum and over screens 8ª and 9ª, where further removal of portions of the fluid mass adhering to said materials is accomplished, accompanied if desired by further spraying. These portions of said fluid mass, together with those passing through segments 8″ and 9″, are transported by carrying chutes 12″ to a common sump 27″, from whence the greater portion thereof may be returned by pump 28″ and conduit 29″ to the body of fluid mass contained in the separating compartment,—in this particular apparatus passing in with the feed of raw material. As noted in the description of Fig. III, the pump 28″ cannot recirculate the hydraulic water, introduced in this particular apparatus through jet pipes 20″ connected by feed pipes 21″ to main hydraulic supply 24″, together with the spray liquid introduced by pipes 13″, hence this excess hydraulic and spray liquid must pass upward in sump 27″ to overflow 30″, from whence it passes to waste or is returned to supply 24″. To maintain a constant level of the superimposed body of liquid, if such be employed, or of the fluid mass itself, if no body of liquid be used, the overflow is provided with the perforate segments 8″ and 9″, at the points 19″ on the drawing, Fig. IV.

The operation of the apparatus just described is similar to that of the types of apparatus shown in Figs. I, II and III, the only difference being in the method of removal of the separated material. This type of apparatus is particularly advantageous when materials to be separated are friable, as conveying worms of the type used are adapted to handle friable materials with a small percentage of incidental breakage.

In the operation of my present invention it will be understood that any mixture of suitable consistency consisting of a comminuted solid and a liquid may be used to form the fluid mass, provided the specific gravity of the resultant fluid mass is less than that of one of the materials to be separated, and that it approximates or is greater than that of the other materials. Siliceous sand such as beach sand, or comminuted metallic oxides or sulphides such as magnitite or pyrite, or combinations of any of such materials, may be employed advantageously to form the solid constituent of the fluid mass, and in some cases comminuted middlings or concentrates may be used. In general, said solid constituent may consist of any suitable solid that is substantially insoluble in the liquid constituent and that does not tend to form a permanent suspension in said liquid, these characteristics being necessary in order that such comminuted solid may be reclaimed readily from the separated materials after they are removed from the fluid mass. The liquid constituent of the fluid mass may consist of water or any other liquid of suitable properties and it will be understood that in the specification and claims hereof the terms "water" and "liquid" are used interchangeably to include such suitable liquid.

In the accompanying drawings the various adjunctive devices shown are intended to represent the general association of elements necessary to the operation of the method, but I do not limit myself to the use of the forms shown. The apparatus necessary for the operation of the method must always consist of the following elements, a rotatable receptacle adapted to contain a fluid mass of the described type, means for maintaining the fluidity of said fluid mass, means for introducing the material to be separated into said fluid mass and means for the removal of the separated material from said fluid mass after separation has been accomplished, the rotation of said receptacle acting to assist in the maintenance of said fluidity. It will be understood that the receptacle may be of any desired shape or form that will permit of its performing the functions described and that one or more such receptacles may be employed. The receptacle may be rotated with uniform or varying angular velocity. The means shown in the drawings for the separation of the materials from the fluid mass are intended to be typical of conveying elements in common use, as other forms such as belt conveyors, scraper lines, sand-wheels, etc., may readily be used by those skilled in the art. The feeding device shown diagrammatically in the several drawings as a simple chute, may be of any desired type, but preferably it should deliver the materials to be separated at or near the surface of the fluid mass, although this is not essential.

The fluidity of the fluid mass may be maintained by the co-action of the rotating receptacle, the conveying element for the removal of the material of high specific gravity and hydraulic liquid introduced within the body of the fluid mass. In some forms of apparatus, such for example as that shown in Figs. I and II, and IV and V, the conveying element for the material of low specific gravity may also co-act to maintain said fluidity. In certain cases additional mechanical means may be provided for said maintenance of fluidity such as are shown diagrammatically in Fig. I of Patent 1,224,138, issued to Thomas M. Chance, May 1, 1917. Under some conditions the mixing effect produced by the rotation of the separating receptacle and its adjunctive elements may be sufficient for such maintenance without the addition of hydraulic liquid. It will be understood that an elastic fluid such as air may replace the hydraulic liquid, and that such elastic fluid or hydraulic liquid may have either uniform or pulsating flow as described in said Patent No. 1,224,138. In some forms of apparatus it may be desirable to apply a portion of the energy for the maintenance of said fluidity to portions of the fluid mass external to the separating receptacle. Such external application of energy may be applied by pumps or other means, it being readily understood by any skilled in the art that if apparatus of the type shown in Fig. III be properly proportioned it will be possible to continuously re-circulate the fluid mass by means of the pump 28″ and sump 27″ in such manner that sufficient energy will be applied by said pump, co-acting with the rotation of drum 1″, to maintain the desired fluidity of the fluid mass, either with or without the introduction of hydraulic water through pipes 20″.

As described in said Patent No. 1,224,138 any desired type of screens or classifying apparatus may be used for maintaining the comminuted solid in proper condition for producing the fluid mass and for reclaiming said fluid mass from the separated material. Said patent further refers to means that may be used for the automatic, or otherwise, regulation of the specific gravity and depth of the fluid mass and it will be understood that such means may likewise be employed in the operation of the present invention.

Under certain conditions of operation the speed of rotation of the separating receptacle may be such as to effect the removal of the separated materials by the frictional contact of the surface of said receptacle with said material, this phenomenon being similar to the "cascade" effect commonly observed in the operation of some types of tube mills. It will be understood that under such conditions of operation the walls of the separating receptacle constitute the conveying element and bucket plates of the type shown in Figs. I and II hereof may be dispensed with. When so operated the speed of rotation must not be so great as to produce a centrifugal component that will seriously affect the fluid mass and separatory process.

If a third compartment, similar to the conveying element 6 of Figs. I and II, is added to the apparatus shown in those drawings, and is provided with a suitable discharge chute of the type shown for said element 6, such modified apparatus may be used for a three-part separation, the density in the intermediate compartment being maintained at a lower value than that in the first compartment. This embodiment of the apparatus is useful in making such a three-part separation as that of coal, bone and slate. It is, of course, obvious that multi-compartment machines of this type may be constructed for use in making multi-part separations.

As already stated, the means used for removing the separated materials from the apparatus, are shown diagrammatically as devices which are intended to be typical of conveying appliances, such as belt and chain conveyors, scraper lines, rakes, etc., in common use as conveying elements. It will be evident to those skilled in the art that it will be possible to use two or more of such conveying elements in combination to effect the desired result and that one such conveying element may be used as auxiliary to another, such for example as the use of a raking device to assist in moving a floating material such as coal from the separating compartment into the second compartment from which it is to be discharged, or the use of a scraper or raking device to increase the capacity of a worm to deliver material.

In those types of apparatus in which the fluid mass occupies two separate compartments as in Figs. I and II and IV and V it will be evident that the specific gravity of the fluid masses occupying these compartments need not necessarily be equal, and that it may often be advantageous to use a lower specific gravity in the second compartment than in the first and that this may be accomplished readily by increasing the hydraulic liquid supplied to the second compartment or by increased mechanical agitation in that compartment. By operating the apparatus illustrated by Figs. I and II in this way and by introducing enough fluid mass to permit of its overflow through 19[a], the circular opening in the drum 1 at the left hand side of Fig. II being enlarged in diameter to confine the overflow to this side of the drum, 19[a] being correspondingly lowered, the apparatus may be used to effect a three part separation, thus slate and heavy refuse being removed by 6, high-ash and bony coal, and laminated slate and coal, being removed by 7, while the purest, lightest and lowest ash coal overflows through 19[a] at the left hand side of the drum, overflow 19 at the right becoming inoperative.

Having described my invention, I claim:—

1. An apparatus for the separation of materials of different specific gravity comprising in combination a rotatable receptacle adapted to contain a fluid mass consisting of an agitated mixture of liquid and comminuted solids insoluble in said liquid; a fluid mass of said type in said receptacle; means for maintaining, by rotation of said receptacle and by the introduction of liquid under pressure, the fluidic properties of said fluid mass said means comprising conduits extending into said receptacle and into said fluid mass, said conduits being connected to a source of supply of liquid under pressure, a partition extending into said fluid mass adapted to confine the movement of materials floating in the upper part of said fluid mass to a direction toward the region of discharge for said floating materials; means for introducing into said fluid mass the materials to be separated and means for removing said materials, after separation has been effected, from said fluid mass.

2. Apparatus for the washing of coal, comprising in combination a rotatable separating chamber; a fluid mass composed of an agitated mixture of sand and water contained therein; means for rotating said chamber; means for introducing water under pressure into said fluid mass; means for introducing coal and its intermixed impurities into said fluid mass; means comprising a partition extending into said fluid mass, adapted to confine movement of coal floating in the upper part of said fluid mass to a direction toward the region provided for the removal of said floating coal from said chamber; means for removing said coal from said chamber and means for removing such of said impurities as have been separated from said floating coal by sinking in said fluid mass.

3. In separating materials of different specific gravities by means of a fluid mass consisting of a maintained suspension in liquid of comminuted solids heavier than said liquid and substantially insoluble therein, the improved method which consists in immersing said solids in a fluid mass of the described type having a specific gravity less than that of the heavier, and greater than that of the lighter, of said materials, in causing the heavier of said materials to sink therein and in removing said heavier materials therefrom, in removing the lighter of said materials floating in said fluid mass, in separating the particles of said lighter materials which are substantially larger than the particles of said comminuted solids from liquid and comminuted solids intermixed with said lighter materials, in causing the residue consisting of liquid, comminuted solids and the smaller particles of said lighter materials to fall as a stream of relatively small cross-sectional area from a higher to a lower level, thereby developing relatively high velocity therein, in causing said stream to impinge into, to agitate and to prevent sedimentation of solids and to maintain the fluidic properties of a portion of said fallen residue, in causing a portion of the liquid constituent of said agitated residue to flow upwardly therethrough and through a portion of said residue superposed above said agitated residue, and to remove particles of low specific gravity therefrom and to maintain the fluidity of said residue, in transporting a portion of said agitated residue to the region overlying said fluid mass and in commingling therewith additional materials to be separated, whereby a portion of the comminuted solids and liquid is returned for reuse in a substantially closed circuit prepared for reuse by the removal of the finer particles of said lighter materials, which are thus recoverable as a separate product.

4. In separating coal from intermixed impurities heavier than said coal by means of a fluid mass consisting of a maintained suspension in liquid of comminuted solids heavier than said liquid and substantially insoluble therein, the improved method which consists in immersing said coal and said intermixed impurities in a fluid mass of the described type having a specific gravity greater than that of said coal and less than that of said intermixed impurities, in causing said heavier impurities to sink in said fluid mass and in removing said impurities therefrom, in removing the coal floating in said fluid mass, in removing the particles of coal which are substantially larger than the particles of said comminuted solids from liquid and comminuted solids intermixed with said coal, in causing the residue consisting of liquid, comminuted solids and the smaller particles of coal to fall as a stream of relatively small cross-sectional area from a higher to a lower level, thereby developing relatively high velocity therein, in causing said stream to impinge into, to agitate, to prevent sedimentation of solids and to maintain the fluidic properties of a portion of said fallen residue, in causing a portion of the liquid constituent of said agitated residue to flow upwardly therethrough and through a portion of said residue superposed above said agitated residue, and to remove small particles of coal therefrom and to maintain the fluidity of said superposed residue, in transporting a portion of said agitated residue, and in delivering same into the region overlying said fluid mass and in commingling therewith additional coal and intermixed impurities, whereby a portion of the liquid and comminuted solids is returned in a substantially closed circuit, prepared for reuse by the removal of the finer particles of said coal which are thus recoverable as a separate product.

5. In separating materials of different specific gravities by means of a fluid separating medium having a specific gravity greater than the lighter of said materials and less than the heavier of said materials, said fluid medium being a maintained suspension of comminuted solids in liquid, said solids being heavier than said lighter materials and substantially insoluble in said liquid, in which a portion of said medium is removed with the materials separated thereby, and in which said portion after separation therefrom of the coarser of said separated materials is returned to the body of said separating medium for reuse therein, the improved method which consists in adding liquid to said portion and in removing therefrom the coarser of said separated materials prior to the return of said portion to said medium for reuse therein, in causing the additional liquid introduced into said portion to rise upwardly through said portion and to be discharged therefrom, in returning to the body of said separating medium, a volume of the mixture of liquid and solids, whereby said upwardly rising liquid produces classifying and flotational effects upon the smaller particles of the lighter materials, causing said particles to rise, together with said uprising liquid, whereby their separation from said portion is effected.

6. In separating coal from intermixed impurities heavier than said coal by means of a fluid separating medium having a specific gravity greater than said coal and less than said impurities, said fluid medium being a maintained suspension of sand in liquid, said sand being heavier than said coal and substantially insoluble in said water, in which a portion of said medium is removed with said coal floating therein and said impurities sinking therethrough, and in which said portion, after separation therefrom of the coarser of the particles of said coal and of said impurities, is returned to the body of said separating medium for reuse therein, the improved method which consists in adding liquid to said portion and in removing therefrom the coarser of the particles of said coal and said impurities prior to the return of said portion to said medium for reuse therein, in causing the additional liquid introduced into said portion to rise upwardly through said portion and to be discharged therefrom, and in returning to the body of said separating medium a volume of the mixture of liquid and solids, whereby said upwardly rising liquid produces classifying and flotational effects upon the smaller particles of said coal, causing said particles to rise, together with said uprising liquid, whereby their separation from said portion is effected.

7. Apparatus for separating materials of different specific gravities comprising in combination, a receptacle adapted to contain a separating fluid medium having a specific gravity greater than the lighter of said materials and less than the heavier of said materials, said fluid medium being a maintained suspension of comminuted solids and liquid, said solids being heavier than said lighter materials and substantially insoluble in said liquid, a fluid medium of the described type in said receptacle, means for introducing liquid under pressure into said fluid medium, whereby agitation and suspension of said solids is effected, means for removing the lighter of said materials floating in said medium and the heavier of said materials sinking through said medium, means for separating the coarser of said removed materials from portions of said fluid medium intermixed with and adhering to said removed materials, comprising sizing and washing means, a vessel adapted to contain fluid medium and liquid from which said coarser materials have been removed, a quantity of said fluid medium and liquid in said vessel, a feed conduit in operative relation to the lower part of said vessel, the area of the mouth of said conduit being relatively small as compared with the horizontal superficial area of said vessel, thereby insuring relatively high velocity of inflow through said mouth and relatively small upward rising velocity in said vessel, means for introducing said fluid medium and liquid through said feed conduit under a pressure greater than the hydrostatic pressure in said lower part of said vessel, means for removing liquid and lighter materials from the upper part of said vessel, a discharge conduit in operative relation to the lower part of said vessel, whereby fluid medium agitated and maintained in fluidic condition by the momentum of the inflowing feed is continuously removed from said vessel, means for delivering fluid medium removed through said discharge conduit to the separating fluid medium in said separating receptacle and means for controlling the quantity of fluid medium removed from said vessel and returned to said separating receptacle, whereby the liquid added to said fluid medium under pressure and added by said washing sprays is caused to rise upwardly through fluid medium contained in said vessel producing classifying and flotational effects upon the smaller particles of said lighter materials, causing said particles to rise together with said uprising liquid to the upper part of said vessel, whereby their separation from said fluid medium is effected by said means provided for their removal.

In testimony whereof I affix my signature.

THOMAS M. CHANCE.